(12) United States Patent
Andrikowich et al.

(10) Patent No.: US 6,831,811 B1
(45) Date of Patent: Dec. 14, 2004

(54) DISK DRIVE WITH EVACUATION/FILL VALVE ASSEMBLY

(75) Inventors: Thomas G. Andrikowich, Whitinsville, MA (US); Kimberly C. Mann, Worcester, MA (US); Michael C. Strzepa, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 55 days.

(21) Appl. No.: 10/266,436

(22) Filed: Oct. 8, 2002

Related U.S. Application Data (60) Provisional application No. 60/371,241, filed on Apr. 8, 2002.

(51) Int. Cl.[7] ............................................. G11B 33/14
(52) U.S. Cl. ............................................. 360/97.02
(58) Field of Search ..................................... 360/97.02

(56) References Cited

U.S. PATENT DOCUMENTS

| | | | |
|---|---|---|---|
| 5,422,766 A | 6/1995 | Hack et al. ............. | 360/97.02 |
| 5,454,157 A | 10/1995 | Ananth et al. ............. | 29/603 |
| 6,205,845 B1 * | 3/2001 | Dinsmore et al. ............. | 73/37 |
| 6,317,286 B1 | 11/2001 | Murphy et al. ............. | 360/97.02 |
| 6,392,838 B1 | 5/2002 | Hearn et al. ............. | 360/97.02 |

* cited by examiner

*Primary Examiner*—A. J. Heinz
(74) *Attorney, Agent, or Firm*—Marsh Fischmann & Breyfogle LLP (57) ABSTRACT

A disk drive having a fluid evacuation/fill valve is disclosed for allowing for the removal of a fluid from an enclosed space within a disk drive housing, for allowing for the introduction of a fluid into this enclosed space, or both. The valve assembly utilizes a sealing member that may be biased into sealing engagement with a portion of an external surface of the disk drive housing to at least substantially isolate the enclosed space from the external environment to the disk drive. These biasing forces may be reduced and/or overcome to allow the valve assembly to "open" and allow for a fluid flow out of and/or into the enclosed space, utilizing a port that extends through a wall of the disk drive housing and a space between a sealing member of the valve assembly and the external surface of the disk drive housing.

54 Claims, 4 Drawing Sheets

DISK DRIVE WITH EVACUATION/FILL VALVE ASSEMBLY

CROSS-REFERENCE TO RELATED APPLICATIONS

This patent application claims priority under 35 U.S.C. §119(e) from U.S. Provisional Patent Application Ser. No. 60/371,241, that was filed on Apr. 8, 2002, and that is entitled "HELIUM FILL/REFILL VALVE FOR SEALED HDA," the entire disclosure of which is incorporated by reference herein.

FIELD OF THE INVENTION

The present invention generally relates to sealed disk drive environments and, more particularly, to evacuating a fluid from and/or directing a fluid into a sealed disk drive environment using a biased sealing member.

BACKGROUND OF THE INVENTION

Conventional disk drives typically include a base plate and a cover that is detachably connected to the base plate to define an enclosure for various disk drive components. One or more data storage disks are generally mounted on a spindle which is rotatably interconnected with the base plate and/or cover so as to allow the data storage disk(s) to rotate relative to both the base plate and cover via a spindle motor. An actuator arm assembly (e.g., a single actuator arm, a plurality of actuator arms, an E-block with a plurality of actuator arm tips), is interconnected with the base plate and/or cover by an appropriate bearing or bearing assembly so as to enable the actuator arm assembly to pivot relative to both the base plate and cover in a controlled manner.

A suspension or load beam may be provided for each data storage surface of each data storage disk. Typically each disk has two of such surfaces. All suspensions are appropriately attached to and extend away from the actuator arm assembly in the general direction of the data storage disk(s) during normal operations. A slider is mounted on the free end of each suspension. One or more transducers, such as in the form of a read/write head, is mounted (e.g., embedded) on each slider for purposes of exchanging signals with the corresponding data storage surface of the corresponding data storage disk. The position of the actuator arm assembly, and thereby each transducer, is controlled by a voice coil motor or the like which pivots the actuator arm assembly to dispose the transducer(s) at the desired radial position relative to the corresponding data storage disk. Linearly actuated actuator arm assemblies are also known. In any case, each data storage surface of each data storage disk has a plurality of concentrically disposed tracks that are available for data storage. Typically these tracks are circular and are concentrically disposed on a data storage disk of a disk drive. As the track density or the number of tracks per inch increases, so to does the need to be able to precisely position the transducer(s) relative to its corresponding data storage surface. Various types of technologies have been proposed for controlling transducer positionings in disk drives.

One type of disk drive design has the slider in spaced relation to its corresponding data storage surface during normal disk drive operations. This is commonly referred to as a flying-type slider in that the slider flies on what is commonly referred to as an air bearing. This air bearing is a thin boundary layer of air that is carried by the rotating data storage disk. The surface of the slider that projects toward its corresponding data storage disk is configured with one or more air bearing surfaces that compress this boundary layer of air. Compression of the boundary layer of air exerts increased pressure on the slider that results in a sufficient resultant lifting force on the slider, that in turn allows it to remain in vertically spaced relation to its corresponding data storage disk during its rotation. Other read/write disk drive technologies are based upon establishing/maintaining contact between the transducer and the data storage surface of the relevant data storage disk at least at certain times during disk drive operations. This has been commonly referred to in the art as contact or near-contact recording.

Rotating data storage desks within a drive may be excited by both internal and external vibrations. Vibrations may cause an undesired relative motion between a given transducer and its corresponding data storage disk. In at least certain cases this can lead to an error in the transfer of data based upon an inaccurate positioning of a given transducer relative to its corresponding data storage disk. This is commonly referred to in the art as "track misregistration" or TMR.

Other factors may increase the occurrence or frequency of TMR. For instance, the need to rapidly access information has led to disk drives having data storage disks that are rotated at ever increasing speeds. Higher rotational speeds for the data storage disk(s) of the drive may increase the vibration of various disk drive components and thereby the occurrence of TMR. Increased vibrations in this case may be due to a turbulent excitation of the head/disk assembly or the HDA of the disk drive. The HDA is commonly contained within a rather small and enclosed space that may be characterized as a disk drive housing (e.g., a cover that is detachably interconnected with a base plate or the like). As such, increased airflow within this small enclosed space due to the increased rotational speeds of data storage disk(s) may cause various disk drive components to vibrate, which in turn may lead to increased occurrences of TMR.

Higher rotational speeds of data storage disks within a drive also generate more aerodynamic drag on the data storage disks and a corresponding increase in the amount of power that is consumed to operate the drive, as well as the operating temperature within the disk drive housing. One solution that has been proposed to reduce the magnitude of both the turbulent excitation of the HDA and aerodynamic drag due to the increased rotational speeds of the data storage disk(s) of the drive has been to replace the air within the enclosed space of the disk drive housing with an inert gas such as helium, nitrogen, or argon. Various ways of providing a hermetically sealed disk drive housing to accommodate the storage of these types of fluids have been proposed. However, these designs have principally focused on sealing the interface between the cover and the base plate of the disk drive, and not the manner in which the air is evacuated from the disk drive housing and then replaced with the desired inert gas.

BRIEF SUMMARY OF THE INVENTION

One way to characterize a first aspect of the present invention is as a method for establishing an operating environment for a data storage device. Another way to characterize this first aspect is as a method for assembling a data storage device. In any case, a first fluid (e.g., one or more gases) is withdrawn from an enclosed space within a housing used by the data storage device. Representative componentry of the data storage device that may be contained within this housing includes a computer-readable data storage medium (e.g., a data storage disk assembly of any appropriate type/configuration), as well as possibly other components such as an actuator assembly of any appropriate type/configuration. A second fluid (e.g., one or more gases) is introduced into this enclosed space through a first port that extends through an entire wall thickness of the housing. Thereafter, this first port is sealed. In this regard, a sealing member is biased into engagement with the housing with a sufficient force to establish a suitable seal for the second fluid within the housing.

Various refinements exist of the features noted in relation to the first aspect of the present invention. Further features may also be incorporated in the first aspect of the present invention as well. These refinements and additional features may exist individually or in any combination. The first port may be formed at any appropriate location on the housing, including on a base plate or cover of the housing. Preferably, the sealing member interfaces with an exterior surface of the housing. However one or more aspects of the present invention cover having the sealing member interface with an interior surface of the housing.

Any amount of the first fluid may be removed from the housing, including all of the first fluid or only part of the first fluid. The pressure within the housing may be at any desired or required level after the withdrawal as well (including a positive or a negative pressure). Preferably, the first fluid will be withdrawn from the enclosed space within the housing before initiating the introduction of the second fluid into the housing in the case of the first aspect. However, the first fluid could be removed from the enclosed space by the introduction of the second fluid into the enclosed space. Air may be the fluid that is removed from the enclosed space of the housing, although any fluid that exists within the housing may be removed from the enclosed space of the housing utilizing the first aspect. The withdrawal of the first fluid from the enclosed space within the housing may include directing this first fluid out through the first port and through a space between the sealing member and the housing. The withdrawal of the first fluid from the enclosed space within the housing may also entail moving the sealing member out of engagement with the housing by a suction force that may be used to accomplish the fluid withdrawal, the pressure being exerted on the sealing member by the first fluid as the first fluid flows out of the housing and past the sealing member, or a combination thereof.

A magnitude of the biasing force being exerted on the sealing member may be reduced before executing at least one of, and more preferably before executing each of, the withdrawal of the first fluid from the enclosed space within the housing and the introduction of the second fluid into the enclosed space within the housing in the case of the first aspect. One portion of a biasing spring may be anchored to the housing while another portion of such a biasing spring engages the sealing member to force the same into appropriate engagement with the housing. The interconnection between this biasing spring and the housing may be loosened and which may reduce the magnitude of the biasing force being exerted on the sealing member by the biasing spring to facilitate the withdrawal of the first fluid and/or the introduction of the second fluid. Once the desired amount of the second fluid has been introduced into the enclosed space of the housing, this interconnection between the biasing spring and the housing may be tightened such that the biasing spring thereafter generates sufficient biasing forces to engage the sealing member against the housing to the desired degree (e.g., to retain of the second fluid within the enclosed space of the housing).

Any appropriate fluid may be introduced into the enclosed space within the housing and for any appropriate purpose in the case of the first aspect, including without limitation helium, hydrogen, argon, nitrogen, air or any combination thereof. Any combination of one or more fluids may be introduced in the case of the first aspect, at any desired or required relative amount(s), and in any appropriate manner. The desired fluid within the housing may actually be a mixture of air and one or more other appropriate fluids. In the case where air and at least one other fluid is the desired fluid within the housing, this mixture may be realized within the housing by leaving a certain amount of air within the housing and then introducing the other fluid(s) therein. Another option would be to withdraw all of the air from the housing, and to then introduce air and one or more other fluids in the desired/required relative amounts (e.g., individually (sequentially or simultaneously); as a mixture). The introduction of the second fluid may be adapted in any appropriate way to achieve the desired result within the housing.

Pressure within the enclosed space of the housing may be established at any appropriate level after the introduction of the second fluid therein in the case of the second aspect (e.g., greater or less than one atmosphere). The introduction of the second fluid into the enclosed space within the housing may include moving the sealing member out of engagement with the housing using a pressure being exerted on the sealing member by a flow of the second fluid onto the sealing member to dispose the same in spaced relation to the housing. A flowpath to the enclosed space within the housing for the second fluid may then include a space between the sealing member and the housing, as well as of course the first port.

Any appropriate configuration for the sealing member may be utilized in the case of the first aspect. For instance, the sealing member could be in the form of a ball that is disposed over and appropriately seated partially within or about an end of the first port that is disposed on an exterior surface of the housing. Typically such a ball would have a larger diameter than the end of the first port being sealed by the ball. Another appropriate configuration would be a sealing member in the form of a needle-valve (e.g., conical or frustumly-shaped) that would extend within the first port to at least a certain degree. The sealing member could also be configured so as to be disposed about the first port when in sealing engagement with the housing. That is, the seal need not be established with an edge of the housing that defines an end of the first port that is disposed on its exterior surface, although this edge could be used to establish the seal. In any case, one way to enhance the seal between the sealing member and the housing is to form at least an exterior portion of the sealing member that engages the housing with a deformable metal so as to provide a suitable seal therebetween. More generally, preferably at least an exterior portion of the sealing member may be formed of a material having a hardness that is less than a hardness of that portion of the housing that is engaged by the sealing member. When such a sealing member is biased into forcible engagement with the housing, at least the outer portion of the sealing member is then able to deform so as to at least substantially conform with the interfacing surface of the housing to improve the seal.

Biasing forces exerted on the sealing member in the case of the first aspect may be derived from any appropriate source, including without limitation by one or more springs that engage the sealing member in any appropriate manner. Any appropriate configuration may be used for such a spring(s). In one embodiment, the sealing member is in the form of a ball that is disposed within a recess formed on a portion of an exterior surface of the housing. This ball has a diameter that is less than that of the recess, that is greater than a depth of the recess such that the ball extends at least slightly beyond adjacent portions of the exterior surface of the housing that are disposed about this recess, and that is greater than a diameter of an end of the first port that is sealed by the ball. This spring is in the form of a flexible beam or the like, is secured to the housing beyond the recess in which the sealing ball is disposed, and extends over and engages a portion of the ball to force the same into contact with a frustumly-shaped base at the bottom of the noted recess where an end of the first port is disposed.

One way to characterize a second aspect of the present invention is as a method for establishing an operating environment for a data storage device. Another way to characterize this second aspect is as a method for assembling a data storage device. In any case, a first fluid (e.g., one or more gases) is introduced into an enclosed space defined at least in part by the housing, through a first port that extends through an entire wall thickness of the housing. Thereafter, this first port is sealed. In this regard, a sealing member is biased into engagement with the housing with a sufficient force to establish a suitable seal for the first fluid within the housing. Representative componentry of the data storage device that may be contained within this housing includes a computer-readable date storage medium (e.g., a data storage disk assembly of any appropriate type/configuration), as well as possibly other components such as an actuator assembly of any appropriate type/configuration.

Various refinements exist of the features noted in relation to the second aspect of the present invention. Further features may also be incorporated in the second aspect of the present invention as well. These refinements and additional features may exist individually or in any combination. The first port may be formed at any appropriate location on the housing, including on a base plate or cover thereof. A second fluid (e.g., one or more gases) may be withdrawn from the enclosed space within the housing used by the data storage device. Any amount of the second fluid may be removed from the housing, including all of the second fluid or only part of the second fluid. The pressure within the housing may be at any desired or required level after the withdrawal as well (including a positive or a negative pressure). Preferably, the second fluid will be withdrawn from the enclosed space within the housing before initiating the introduction of the first fluid into the housing. However, the second fluid could be removed from the enclosed space by the introduction of the first fluid into the enclosed space. Air may be the fluid that is removed from the enclosed space of the housing, although any fluid that exists within the housing may be removed from the enclosed space of the housing utilizing the second aspect. The withdrawal of the second fluid from the enclosed space within the housing may include directing this second fluid out through the first port and through a space between the sealing member and the housing. The withdrawal of the second fluid from the enclosed space within the housing may also entail moving the sealing member out of engagement with the housing by a suction force that may be used to accomplish the fluid withdrawal, the pressure being exerted on the sealing member by the second fluid as the second fluid flows out of the housing and past the sealing member, or a combination thereof.

A magnitude of the biasing force being exerted on the sealing member may be reduced before executing at least the introduction of the first fluid into the enclosed space within the housing in the case of the second aspect (e.g., such a reduction may also be done before executing the withdrawal of the second fluid from the enclosed space within the housing discussed above). One portion of a biasing spring may be anchored to the housing while another portion of such a biasing spring engages the sealing member to force the same into appropriate engagement with the housing. The interconnection between this biasing spring and the housing may be loosened and which may reduce the magnitude of the biasing force being exerted on the sealing member by the biasing spring to facilitate the withdrawal of the second fluid and/or the introduction of the first fluid into the enclosed space. Once the desired amount of the first fluid has been introduced into the enclosed space of the housing, this interconnection between the biasing spring and the housing may be tightened such that the biasing spring thereafter generates sufficient biasing forces to engage the sealing member against the housing to the desired degree (e.g., to retain the first fluid within the enclosed space of the housing).

Any appropriate first fluid may be introduced into the enclosed space within the housing and for any appropriate purpose in the case of the second aspect, including without limitation helium, hydrogen, argon, nitrogen, air or any combination thereof. Any combination of one or more fluids may be introduced in the case of the second aspect, at any desired or required relative amount(s), and in any appropriate manner. The desired fluid within the housing may actually be a mixture of air and one or more other appropriate fluids. In the case where air and at least one other fluid is the desired fluid within the housing, the mixture may be realized within the housing by leaving a certain amount of air within the housing and then introducing the other fluid(s) therein. Another option would be to withdraw all of the air from the housing, and to then introduce air and one or more other fluids in the desired/required relative amounts(s) (e.g., individually (sequentially or simultaneously); as a mixture). The introduction of the first fluid may be adapted in any appropriate way to achieve the desired result within the housing.

Pressure within the enclosed space of the housing may be established at any appropriate level after the introduction of the first fluid therein. The introduction of the first fluid into the enclosed space within the housing may include moving the sealing member out of engagement with the housing using a pressure being exerted on the sealing member by a flow of this first fluid onto the sealing member to dispose the same in spaced relation to the housing. A flowpath to the enclosed space within the housing for the first fluid may then include a space between the sealing member and the housing, as well as of course the first port.

Any appropriate configuration for the sealing member may be utilized in the case of the second aspect. For instance, the sealing member could be in the form of a ball that is disposed over and appropriately seated partially within or about an end of the first port that is disposed on an exterior surface of the housing. Typically such a ball would have a larger diameter than the end of the first port being sealed by the ball. Another appropriate configuration would be a sealing member in the form of a needle-valve (e.g., conical or frustumly-shaped) that would extend within the first port to at least a certain degree. The sealing member could also be configured so as to be disposed about the first port when in sealing engagement with the housing. That is, the seal need not be established with an edge of the housing that defines an end of the first port that is disposed on its exterior surface, although this edge could be used to establish the seal. In any case, one way to enhance the seal between the sealing member and the housing is to form at least an exterior portion of the sealing member that engages the housing with a deformable metal so as to provide a suitable seal therebetween. More generally, preferably at least an exterior portion of the sealing member may be formed of a material having a hardness that is less than a hardness of that portion of the housing that is engaged by the sealing member. When such a sealing member is biased into forcible engagement with the housing, at least the outer portion of the sealing member is then able to deform so as to at least substantially conform with the interfacing surface of the housing to improve the seal.

Biasing forces exerted on the sealing member in the case of the second aspect may be derived from any appropriate source, including without limitation by one or more springs that engage the sealing member in any appropriate manner. Any appropriate configuration may be used for such a spring(s). In one embodiment, the sealing member is in the form of a ball that is disposed within a recess formed on a portion of an exterior surface of the housing. This ball has a diameter that is less than that of the recess, that is greater than a depth of the recess such that the ball extends at least slightly beyond adjacent portions of the exterior surface of the housing that are disposed about this recess, and that is greater than a diameter of an end of the first port that is sealed by the ball. This spring is in the form of a flexible beam or the like, is secured to the housing beyond the recess in which the sealing ball is disposed, and extends over and engages a portion of the ball to force the same into contact with a frustumly-shaped base at the bottom of the noted recess where an end of the first port is disposed.

A third aspect of the present invention is embodied by a data storage device that includes a housing. This housing defines an at least substantially enclosed space, has an interior surface that interfaces with this enclosed space, and an oppositely disposed exterior surface. A distance between the interior and exterior surfaces of the housing at a given location thereby defines a wall thickness for the housing at this particular location. Appropriate data storage device componentry within the enclosed space defined by the housing includes without limitation a computer-readable data storage medium (e.g., a data storage disk assembly of any appropriate type/configuration), as well as possibly other components such as an actuator assembly of any appropriate type/configuration. A port extends between a portion of the interior surface of the housing and a portion of the exterior surface of the housing to fluidly connect the enclosed space of the housing with an external environment. However, a sealing member is associated with this first port and is at least at times engageable with the housing to seal the interior of the housing. In this regard, the data storage device of this third aspect further includes a biasing member that forcibly engages the sealing member against the housing to provide a suitable seal at the desired time.

Various refinements exist of the features noted in relation to the third aspect of the present invention. Further features may also be incorporated in the third aspect of the present invention as well. These refinements and additional features may exist individually or in any combination. The data storage device may be in any appropriate configuration. For instance, one or more data storage disks may define a data storage disk assembly for the data storage device of the third aspect. Any appropriate type of an actuator assembly may be used by the data storage device of the third aspect as well (e.g., linear, rotary). In one embodiment, the data storage device of the third aspect is a hard disk drive.

The port may be formed at any appropriate location on the housing in the case of the third aspect, including on a cover or base plate thereof. The housing used by the third aspect also may be of any appropriate configuration. For instance, a cover may be detachably interconnected with a base plate to collectively define this housing. Both the cover and base plate may be of any appropriate configuration. Any appropriate way of establishing an appropriate seal between such a cover and base plate may be utilized as well, including any appropriate way for providing a hermetic seal between the cover and base plate. In this regard, the data storage device of the third aspect may include a fluid that is sealed within the housing at any desired pressure. Any appropriate fluid may be retained within the housing and for any appropriate purpose in the case of the third aspect, including without limitation helium, hydrogen, argon, nitrogen, air, or any combination thereof and in the desired/required relative amount(s). Moreover, any combination of one or more fluids (e.g., helium and air) may be contained within the housing at any desired or required relative amount. Pressure within the housing may be at any appropriate level as well.

Any appropriate configuration for the sealing member may be utilized in the case of the third aspect. For instance, the sealing member could be in the form of a ball that is disposed over and appropriately seated on or about an end of the first port that is disposed on an exterior surface of the housing. Typically such a ball would have a larger diameter than the end of the first port being sealed by the ball. Another appropriate configuration would be a sealing member in the form of a needle-valve (e.g., conical or frustumly-shaped) that would extend within the first port to at least a certain degree. The sealing member could also be configured so as to be disposed about the first port when in sealing engagement with the housing. That is, the seal need not be established with an edge of the housing that defines an end of the first port, although this edge could be used to establish the seal. In any case, one way to enhance the seal between the sealing member and the housing is to form at least an exterior portion of the scaling member that engages the housing with a deformable metal so as to provide a suitable seal therebetween. More generally, preferably at least an exterior portion of the sealing member may be formed of a material having a hardness that is less than a hardness of that portion of the housing that is engaged by the scaling member. When such a sealing member is biased into engagement with the housing, at least the outer portion of the sealing member is then able to deform so as to at least substantially conform with the interfacing surface of the housing to improve the seal.

Biasing forces exerted on the sealing member in the case of the third aspect may be derived from any appropriate source, including without limitation by one or more springs that engage the sealing member in any appropriate manner. Any appropriate configuration may be used for such a spring. In one embodiment, the sealing member is in the form of a ball that is disposed within a recess formed on a portion of an exterior surface of the housing. This ball has a diameter that is less than that of the recess, that is greater than a depth of the recess such that the ball extends at least slightly beyond adjacent portions of the exterior surface of the housing, and that is greater than a diameter of an end of the first port that is sealed by the ball. This spring is in the form of a flexible beam or the like, is secured to the housing beyond the recess in which the sealing ball is disposed, and extends over and engages a portion of the ball to force the same into contact with a frustumly-shaped base at the bottom of the noted recess where an end of the first port is disposed.

DETAILED DESCRIPTION OF THE INVENTION

Figure 1:
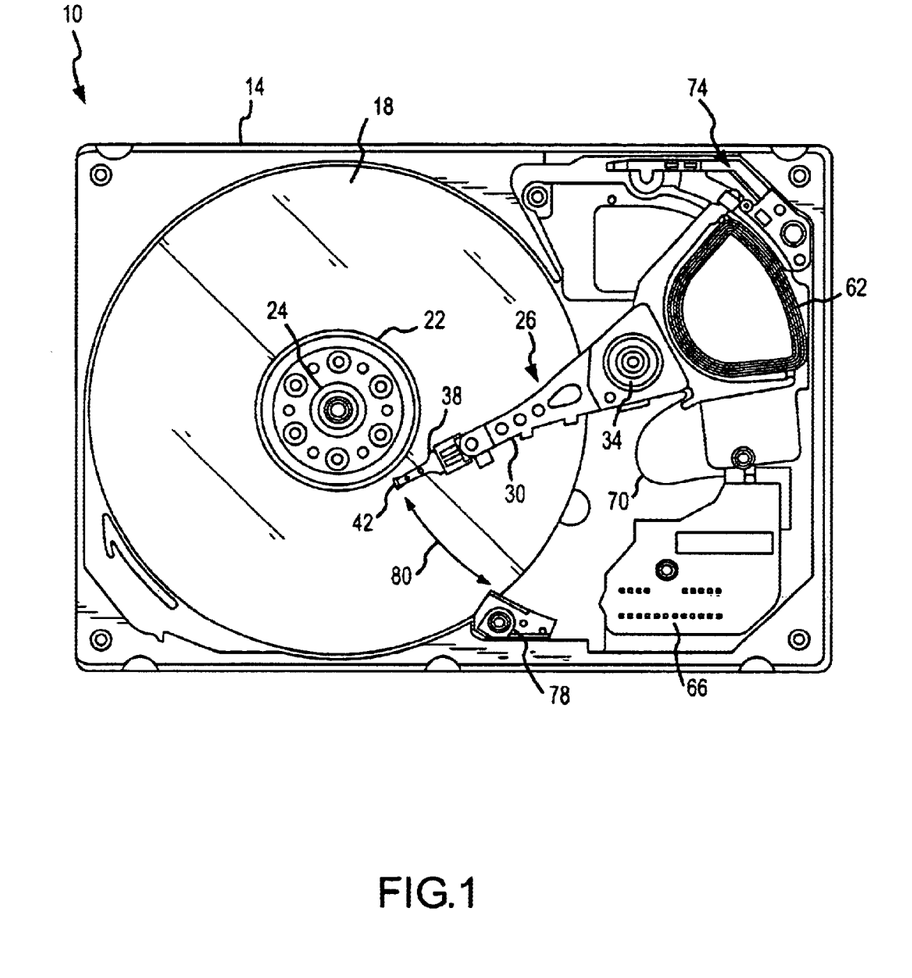
FIG. 1 is a top or plan view of one embodiment of a disk drive.
Figure 2:
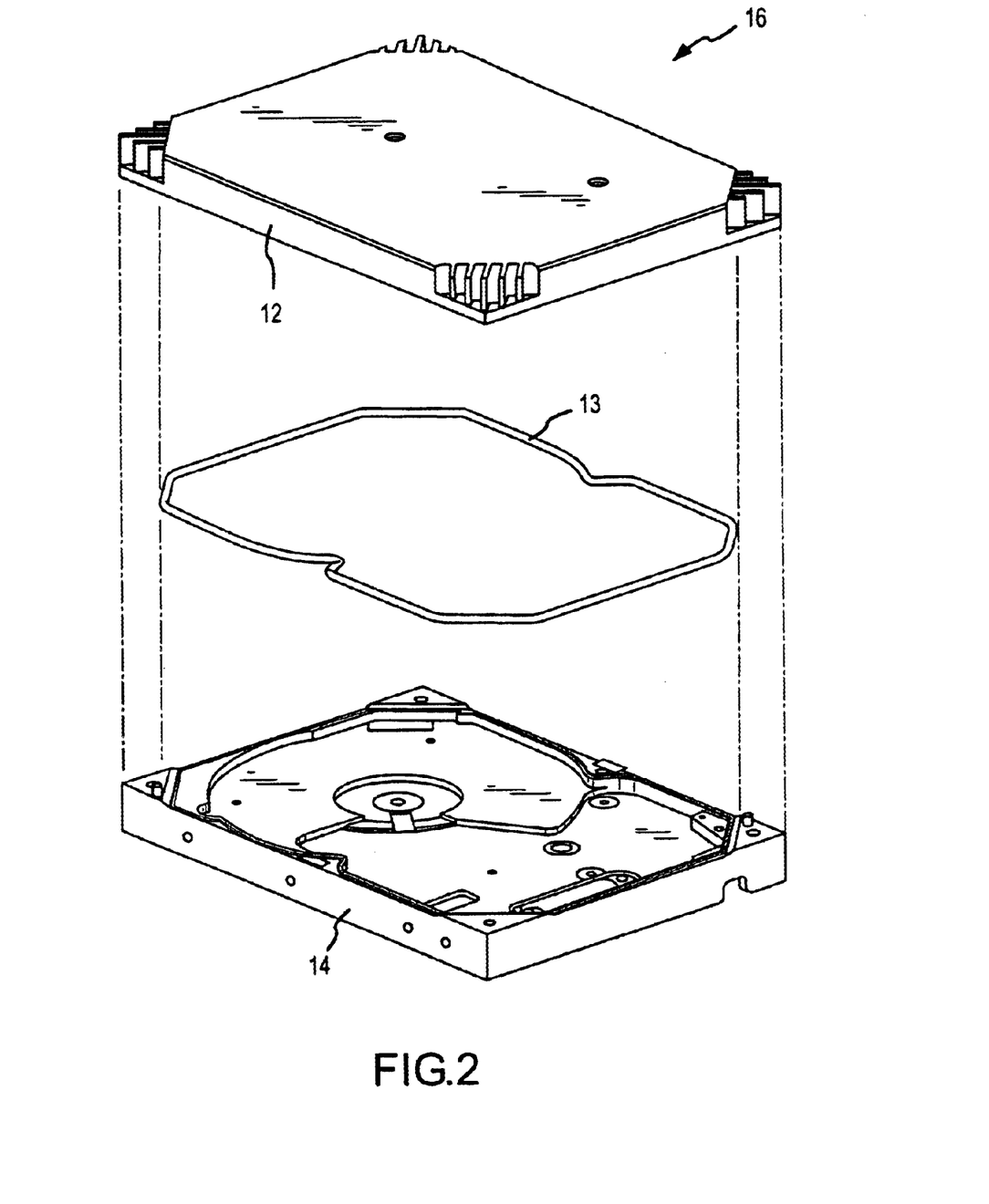
FIG. 2 is an exploded, perspective view of one embodiment of a hermetically sealed disk drive housing that may be utilized by the disk drive of FIG. 1.
Figure 3:
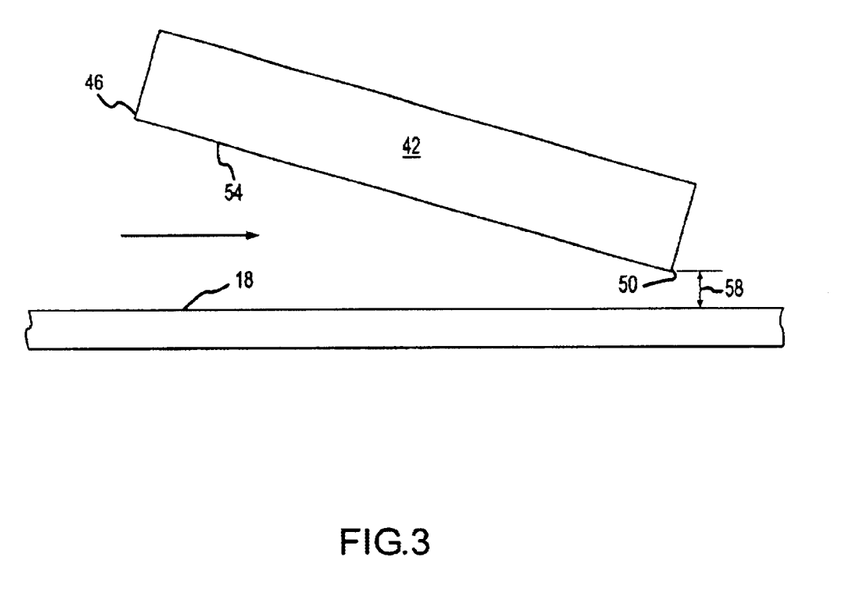
FIG. 3 is a side view of one embodiment of a flying-type slider that may be used by the disk drive of FIG. 1.

The present invention will now be described in relation to the accompanying drawings which at least assist in illustrating its various pertinent features. One embodiment of a disk drive 10 is illustrated in FIGS. 1–3. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub or spindle 22, which in turn is rotatably interconnected with the disk drive base plate 14 and/or cover 12. Multiple data storage disks 18 would be mounted in vertically spaced and parallel relation on the spindle 22. Rotation of the disk(s) 18 is provided by a spindle motor 24 that is coupled to the spindle 22 to simultaneously spin the data storage disk(s) 18 at an appropriate rate.

The disk drive 10 also includes an actuator arm assembly 26 that pivots about a pivot bearing 34, which in turn is rotatably supported by the base plate 14 and/or cover 12. The actuator arm assembly 26 includes one or more individual rigid actuator arms 30 that extend out from or near the pivot bearing 34. Multiple actuator arms 30 would be disposed in vertically spaced relation, with one actuator arm 30 typically being provided for each major data storage surface of each data storage disk 18 of the disk drive 10. Other types of actuator arm assembly configurations could be utilized as well, such as an "E" block having one or more rigid actuator arm tips or the like that cantilever from a common structure. In any case, movement of the actuator arm assembly 26 is provided by an actuator arm drive assembly, such as a voice coil motor 62 or the like. The voice coil motor 62 is a magnetic assembly that controls the operation of the actuator arm assembly 26 under the direction of control electronics 66. Any appropriate actuator arm assembly drive type may be utilized by the disk drive 10, including a linear drive (for the case where the actuator arm assembly 26 is interconnected with the base plate 14 and/or cover 12 for linear movement versus the illustrated pivoting movement about the pivot bearing 34) as well as other types of rotational/pivoting drives.

A load beam or suspension 38 is attached to the free end of each actuator arm 30 or actuator arm tip, and cantilevers therefrom. Typically the suspension 38 is biased at least generally toward its corresponding disk 18 by a spring-like force. A slider 42 is disposed at or near the free end of each suspension 38. What is commonly referred to in the art as the "head" (e.g., at least one transducer) is appropriately mounted on the slider 42 and is used in disk drive read/write operations. Various types of read/write technologies may be utilized by the head on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head is interconnected with the control electronics 66 of the disk drive 10 by a flex cable 70 that is typically mounted on the actuator arm assembly 26. Signals are exchanged between the head on the slider 42 and its corresponding data storage disk 18 for disk drive read and/or write operations. In this regard, the voice coil motor 62 pivots the actuator arm assembly 26 to simultaneously move each head on its slider 42 along a path 80 and "across" the corresponding data storage disk 18 to position the head at the desired/required radial position on the disk 18 (i.e., at the correct track on the data storage disk 18) for disk drive read/write operations.

When the disk drive 10 is not in operation, the actuator arm assembly 26 is pivoted to a "parked position". The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk (18) to typically both move the corresponding slider 42 vertically away from its corresponding data storage disk 18 and to also exert somewhat of a retaining force on the actuator arm assembly 26. Any configuration for the ramp assembly 78 that provides the desired "parking" function may be utilized. The disk drive 10 could also be configured to be of the contact start/stop type, where the actuator arm assembly 26 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm assembly 30 in this parked position if the disk drive 10 is exposed to a shock event. In this regard, the disk drive 10 includes an actuator arm assembly latch 74 that moves from a non-latching position to a latching position to engage the actuator arm assembly 26 so as to preclude the same from pivoting in a direction which would tend to drag the slider(s) 42 across their corresponding data storage disk 18.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
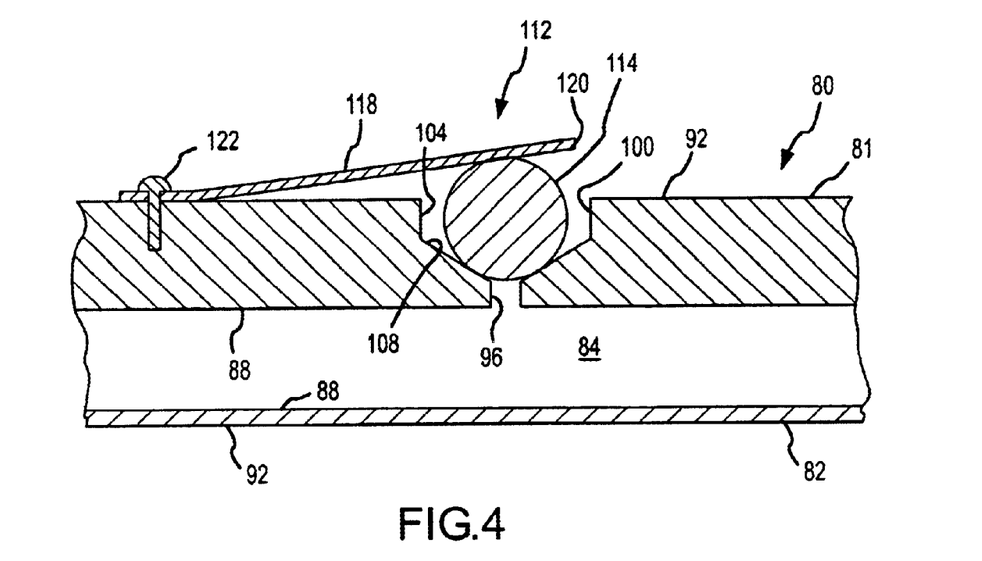
FIG. 4 is a cross-sectional view of one embodiment of a valve assembly in a position to seal an enclosed space of a disk drive housing.

One embodiment of what may be characterized as a disk drive valve assembly 112 is illustrated in FIG. 4. Generally, the valve assembly 112 allows for both the withdrawal of a fluid from (e.g., air) and the introduction of a fluid into (e.g., helium) an enclosed space 84 of a disk drive housing 80 of at least generally of the above-described type in relation to the disk drive 10 of FIGS. 1–3. However, the disk drive housing 80 may be of any appropriate configuration and/or structure. In fact, the valve assembly 112 may be utilized by any type of disk drive or other data storage device where it may be desirable to remove a fluid from an enclosed space, introduce a fluid into an enclosed space, or both. Typically these types of enclosed spaces will be at least substantially hermetically sealed. Any way of providing such a hermetic seal for the disk drive housing 80 may be utilized in combination with the valve assembly 112. Examples of hermetically sealed disk drive housings are disclosed in U.S. Pat. Nos. 6,392,838; 5,454,157; and 5,422,766, all of which are currently assigned to the assignee of the subject patent application and the entire disclosures of each such patent being incorporated by reference in their entirety herein.

The disk drive housing 80 includes a base plate 81 that is detachably interconnected with a cover 82 to define the enclosed space 84 for various disk drive components. The disk drive housing 80 includes an interior surface 88 that interfaces with the enclosed space 84, as well as an oppositely disposed exterior surface 92 that would interface with the external environment to a disk drive that incorporates the disk drive housing 80. A port 96 extends from the exterior surface 92 of the disk drive housing 80 all the way to its interior surface 88 to fluidly interconnect the enclosed space 84 with the external environment to a disk drive utilizing the disk drive housing 80. Although the port 96 is illustrated as being on the base plate 81, it could be formed on the cover 82. The port 96 may be disposed at any appropriate location on the disk drive housing 80. Moreover, the port 96 also may be of any appropriate size and/or configuration. What is of importance is that the port 96 allows for the removal of air or any other fluid from the enclosed space 84 of the disk drive housing 80, the introduction of an appropriate fluid into the enclosed space 84, or both, preferably within a reasonable amount of time so as to not have a significant, adverse effect on the overall disk drive assembly time/cost.

The port 96 is disposed within a recess 100 that is formed on the exterior surface 92 of the disk drive housing 80. The recess 100 may be of any appropriate size and/or configuration. In the illustrated embodiment, the recess 100 includes a cylindrical sidewall 104 and a frustumly-shaped (truncated cone) or inwardly and downwardly sloping base 108. In the illustrated embodiment, the port 96 is disposed at the center of the recess 100 and at the lowest extreme of the recess 100.

The valve assembly 112 includes a sealing member 114 that is at least partially disposed within the recess 100 formed on the exterior surface 92 of the disk drive housing 80. Biasing forces are exerted on the sealing member 114 by a spring 118 of the valve assembly 112 to appropriately seat the sealing member 114 against the disk drive housing 80 and as illustrated in FIG. 4. "Properly seated" or the like means that the enclosed space 84 is at least substantially isolated from the external environment to a disk drive that incorporates the housing 80 and again which is the position illustrated in FIG. 4, and more preferably so as to retain a desired and pressurized fluid within the enclosed space 84. In the illustrated embodiment, the sealing member 114 engages an annular portion of the base 108 of the recess 100 that is disposed about the port 96. Any other appropriate way of establishing a sealing engagement between the sealing member 114 and disk drive housing 80 may be utilized. For instance, the seal could be established at the edge defined by the intersection of the exterior surface 92 of the disk drive housing 80 and the port 96, or somewhere within the interior of the port 96 (e.g., utilizing a needle valve-type configuration/arrangement).

The sealing member 114 is in the form of a ball or sphere in the illustrated embodiment. However, other appropriate shapes could be utilized. Preferably, the sealing member 114 has at least an exterior surface or skin that is softer than the material of the disk drive housing 80 that is engaged by the sealing member 114. That is, preferably the hardness of at least an exterior portion of the sealing member 114 is less than the hardness of the material that defines the surface of the disk drive housing 80 that is engaged by the sealing member 114. Typically the port 96 will be formed in the base plate 81 of the disk drive housing 80 as noted, which is commonly formed from aluminum. As such and in one embodiment, the sealing member 114 is in the form of steel ball or the like having a plating of a metal on its exterior surface that is softer than aluminum. Representative metals for an interfacing surface of the sealing member 114 for the case of an aluminum base plate 81 include tin, other appropriate metals, any appropriate alloy, or any other appropriate material. Using a softer metal on at least an exterior surface or skin of the sealing member 114 allows at least an exterior portion of the sealing member 114 to deform into at least substantially conforming engagement with the surface of the disk drive housing 80 that is engaged by the sealing member 114. That is, an exterior portion of the sealing member 114 is able to deform into at least substantially conforming relation to the surface roughness of the interfacing surface of the disk drive housing 80, as well to any machine markings that may exist on the interfacing surface of the disk drive housing 80. This deformation of a metal exterior portion of the sealing member 114 in this manner thereby provides a desired pressure seal between the sealing member 114 and the disk drive housing 80.

Another component of the valve assembly 112 is a spring 118. The spring 118 is appropriately interconnected with the disk drive housing 80 and may be formed from any appropriate material (e.g., an appropriate metal) and may be of any appropriate configuration. One or more screws 122 may extend through the spring 118 and into the body of the disk drive housing 80 to establish the desired interconnection. Functionally, the spring 118 exerts a biasing force on the sealing member 114 by a flexing of the spring 118 in the illustrated embodiment. Such a biasing force engages the sealing member 114 against the disk drive housing 80 and is of a magnitude to establish an appropriate seal between the disk drive housing 80 and the sealing member 114. In one embodiment, a biasing force of at least about thirty (30) pounds is exerted on the sealing member 114 by the spring 118. Any appropriate configuration for the spring 118 may be utilized by the valve assembly 112 to provide the desired biasing function.

In the illustrated embodiment, the spring 118 of the valve assembly 112 is at least generally in the form of a cantilever. That is, the spring 118 is anchored or fixed to the disk drive housing 80 at least at one location (e.g., corresponding with the location of the screw 122) that is displaced from a free end 120 of the spring 118, and further that is disposed beyond a perimeter of the recess 100. Those portions of the spring 118 that are located between its free end 120 and the closest location where the spring 118 is anchored or fixed to the disk drive housing 80 is able to move at least generally move away from or toward the disk drive housing 80. This "movable portion" of the spring 118 of sorts engages the sealing member 114 and forces the same against the base 108 of the recess 100 on the disk drive housing 80. An annular seal is thereby formed about the port 96. In the illustrated embodiment, the sealing member 114 extends vertically beyond the recess 100 (that is, the sealing member 114 is "taller" than the depth of the recess 100) and the spring 118 extends over the sealing member 114 to exert the desired biasing force thereon or one that is at least generally directed toward the disk drive housing 80. Any other appropriate arrangement for exerting a desired biasing force to establish the desired seal between the enclosed space 84 and the external environment may be utilized.

Figure 5:
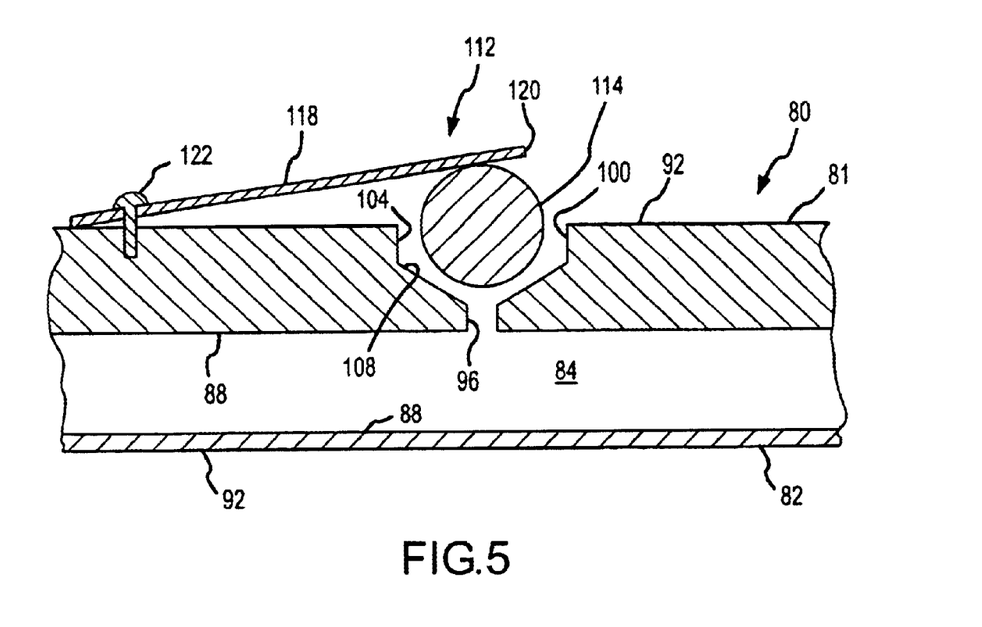
FIG. 5 is a cross-sectional view of the valve assembly of FIG. 4 in position to remove a fluid from and/or introduce a fluid into the enclosed space of the disk drive housing.

The valve assembly 112 may be utilized to withdraw a fluid out of the enclosed space 84 of the disk drive housing 80, to introduce a fluid into the enclosed space 84 of the disk drive housing 80, or both. FIG. 5 illustrates one way in which this fluid transfer may be accomplished. Initially, the screw 122 may be loosened such that the biasing force exerted by the spring 118 on the sealing member 114 is reduced and possibly at least substantially eliminated (for instance, eliminated except for the weight of the spring 118 acting on the sealing member 114) from the configuration presented in FIG. 4. FIG. 4 again depicts the sealing member 114 being appropriately seated against the disk drive housing 80 to at least substantially isolate the enclosed space 84 from the external environment to a disk drive that utilizes the disk drive housing 80, and more preferably to provide a pressure seal. An appropriate evacuation/fill apparatus may establish an appropriate seal about at least the port 96 (as well as about the entire valve assembly 112 in one embodiment) to allow a fluid to be withdrawn from the enclosed space 84, through the port 96, and past a space between the sealing member 114 and the base 108 of the recess 100 formed on the exterior surface 92 of the disk drive housing 80. Typically such a seal will be disposed beyond the recess 100 as well. In any case, the fluid pressure of the flow out of the enclosed space 84 of the disk drive housing 80, the suction force that provides for this withdrawal, or both may be utilized to dispose the sealing member 114 in at least partially spaced relation to the disk drive housing 80 to provide an appropriate flowpath past the sealing member 114. These forces may be of a sufficient magnitude so as to not require that the screw 122 be loosed from the position illustrated in FIG. 4 to the position illustrated in FIG. 5, prior to initiating fluid withdrawal or evacuation operations from the enclosed space 84. That is, the suction force and/or fluid flow out of the enclosed space 84 of the disk drive housing 80 may be of a sufficient magnitude to overcome the biasing forces that are normally exerted on the sealing member 114 by the spring 118 to appropriately seat the same against the disk drive housing 80—"overcoming" meaning to dispose the sealing member 114 in spaced relation to the disk drive housing 80 to provide an appropriate flowpath out of the enclosed space 84 past the sealing member 114.

Any fluid that occupies the enclosed space 84 may be withdrawn from the enclosed space 84. Any amount of fluid may be withdrawn from the enclosed space 84, including all of this fluid or only part of this fluid. The pressure within the enclosed space 84 may be at any desired or required level after the evacuation as well (including a positive or negative pressure). In any case, once the enclosed space 84 has been evacuated to the desired degree and continuing to refer to FIG. 5, a desired fluid may be introduced into the enclosed space 84 of the disk drive housing 80. Any appropriate fluid that may be introduced into the enclosed space 84 of the disk drive housing 80 and for any desired purpose, including without limitation one or more of helium, nitrogen, argon, hydrogen, air, or any combination thereof. Helium provides a number of desirable benefits in relation to being within the enclosed space 84, including without limitation decreasing the amount of power required to rotate the data storage disk(s) of the disk drive by reducing aerodynamic drag, reducing turbulence from the rotation of this disk(s), lowering the operating temperature within the enclosed space 84, and providing a more inert environment within the disk drive housing 80 (e.g., to reduce/eliminate oxidation).

Any combination of one or more fluids may be introduced into the enclosed space 84 at any desired or required relative amount(s). If a combination of air and one or more other fluids is desired for the enclosed space 84, this may be realized in any appropriate way. One way would be to leave the desired/required amount of air in the enclosed space 84 after the excavation operation, and to then introduce the relevant amount of the other fluid or fluids either individually (e.g., sequentially or simultaneously) or as a mixture. Another option would be to evacuate all of the air from the enclosed space 84, and to then introduce air and one or more other fluids in the desired/required relative amounts (e.g., individually (either sequentially or simultaneously); as a mixture). Preferably the same apparatus is used to execute both the fluid evacuation and reintroduction operations, and further without breaking the seal about the port 96. That is, an appropriate apparatus may establish an appropriate seal about at least the port 96 to allow a fluid to be introduced into the enclosed space 84 by passing through a space between the sealing member 114 and the base 108 of the recess 100 formed on the exterior surface 92 of the drive housing 80, and then through the port 96 and to the enclosed space 84 within the disk drive housing 80. The fluid pressure of the flow into the enclosed space 84 of the disk drive housing 80, the pressure head or force that provides for this fluid introduction, or both may be utilized to dispose the sealing member 114 in spaced relation to the disk drive housing 80. These forces again may be of a sufficient magnitude so as to not require that the screw 122 be loosed from the position illustrated in FIG. 4 to the position illustrated in FIG. 5 prior to initiating the introduction of fluid into the enclosed space 84 of the disk drive housing 80. That is, the pressure head and/or fluid flow into the enclosed space 84 of the disk drive housing 80 may be of a sufficient magnitude to overcome the biasing forces that are normally exerted on the sealing member 114 by the spring 118 to appropriately seat the same against the disk drive housing 80—"overcoming" again meaning to dispose the sealing member 114 in spaced relation to the disk drive housing 80 to provide an appropriate flowpath into the enclosed space 84 of the disk drive housing 80. In the case where the screw 122 is loosened to at least reduce the biasing forces being exerted by the spring 118 on the sealing member 114 compared to the configuration presented in FIG. 4, and where it is encompassed by the seal, the seal established by the fluid evacuation/fill apparatus preferably allows the screw 122 to be tightened to a degree to properly seat the sealing member 114 against the disk drive housing 80 prior to (e.g., using a sealed driver bit) or at least shortly after breaking the seal of the fluid evacuation/fill apparatus about the port 96. That is, after the desired amount of fluid has been introduced into the disk drive housing 80, the screw 122 may be tightened such that the sealing member 114 is driven into forcible engagement with the disk drive housing 80 to establish a desired seal. The enclosed space 84 may be pressurized with the desired fluid to any appropriate magnitude. Thereafter, the seal between the evacuation/fill apparatus and the disk drive housing 80 may be broken.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for making a data storage device, said method comprising the steps of:
   withdrawing a first fluid from an enclosed space within a housing of said data storage device using an apparatus, wherein said data storage device comprises a computer-readable data storage medium disposed within said enclosed space;
   introducing a second fluid into said enclosed space through a first port that extends through a wall of said housing using said apparatus;
   disconnecting said apparatus from said data storage device after said introducing step; and
   sealing said first port at least after said disconnecting step to at least substantially isolate said enclosed space from an environment that is external to said data storage device so as to retain said second fluid within said enclosed space, wherein said sealing step comprises biasing a sealing member into forcible engagement with said housing.

2. A method, as claimed in claim 1, wherein:
   said withdrawing a first fluid step comprises withdrawing air from said enclosed space.

3. A method, as claimed in claim 1, wherein:
   said withdrawing a first fluid step comprises withdrawing said first fluid from said enclosed space through said first port and past a space between said sealing member and said housing.

4. A method, as claimed in claim 1, wherein:
   said withdrawing step comprises moving said sealing member out of said forcible engagement with said housing and against a force used by said biasing step, wherein said moving step is provided by a fluid pressure of a flow of said first fluid out of said enclosed space.

5. A method, as claimed in claim 1, wherein:
   said withdrawing step is executed and completed before said introducing step.

6. A method, as claimed in claim 1, further comprising the step of:
   reducing a magnitude of a biasing force exerted on said sealing member for said sealing step, wherein said reducing step is executed before executing at least one of said withdrawing and introducing steps.

7. A method, as claimed in claim 1, further comprising the step of:
   loosening an engagement between a biasing spring and said housing for execution of at least one of said withdrawing and introducing steps, wherein said biasing spring engages said sealing member for said sealing step.

8. A method, as claimed in claim 7, wherein:
   said sealing step further comprises tightening said engagement between said biasing spring and said housing.

9. A method, as claimed in claim 1, further comprising the step of:
   securing a biasing spring to said housing using a first force for execution of at least one of said withdrawing and introducing steps, wherein said biasing spring engages said sealing member for said sealing step, and wherein said sealing step further comprises securing said biasing spring to said housing using a second force that is greater than said first force.

10. A method, as claimed in claim 1, wherein:
    said introducing step comprises moving said sealing member out of said forcible engagement with said housing by a fluid pressure of a flow of said second fluid into said enclosed space.

11. A method, as claimed in claim 1, wherein:
    said second fluid is selected from the group consisting of helium, hydrogen, argon, nitrogen, air, and any combination thereof.

12. A method, as claimed in claim 1, wherein:
    said biasing step comprises using a spring that is attached to said housing.

13. A method, as claimed in claim 1, wherein:
    said sealing step comprises deforming a metal disposed on at least an exterior of said sealing member into at least substantially conforming relation with an interfacing surface of said housing.

14. A method, as claimed in claim 1, wherein:
    said sealing step comprises disposing said sealing member at least partially within a recess formed on an exterior surface of said housing and extending a spring over at least a portion of said recess to engage said sealing member and bias said sealing member into engagement with said housing, wherein said first port is disposed within said recess.

15. A method for making a data storage device, said method comprising the steps of:
    introducing a first fluid into an enclosed space within a housing of said data storage device using an apparatus, wherein said data storage device comprises a computer-readable data storage medium disposed within said enclosed space, wherein said introducing step is executed through a first port that extends through a wall of said housing;
    disconnecting said apparatus from said data storage device after said introducing step; and
    sealing said first port at least after said disconnecting step to at least substantially isolate said enclosed space from an environment that is external to said data storage device so as to retain said first fluid within said enclosed space, wherein said sealing step comprises biasing a sealing member into forcible engagement with said housing.

16. A method, as claimed in claim 15, further comprising the step of:

withdrawing a second fluid from said enclosed space.

17. A method, as claimed in claim 16, wherein:

said withdrawing step comprises withdrawing air from said enclosed space.

18. A method, as claimed in claim 16, wherein:

said withdrawing step comprises withdrawing said second fluid from said enclosed space through said first port and past a space between said sealing member and said housing.

19. A method, as claimed in claim 16, wherein:

said withdrawing step comprises moving said sealing member out of said forcible engagement with said housing and against a force used by said biasing step, wherein said moving step is provided by a fluid pressure of a flow of said second fluid out of said enclosed space.

20. A method, as claimed in claim 16, wherein:

said withdrawing step is executed and completed before said introducing step.

21. A method, as claimed in claim 15, further comprising the step of:

reducing a magnitude of a biasing force exerted on said sealing member for said sealing step, wherein said reducing step is executed before execution of at least said introducing step.

22. A method, as claimed in claim 15, further comprising the step of:

loosening an engagement between a biasing spring and said housing for execution of at least said introducing step, wherein said biasing spring engages said sealing member for said sealing step.

23. A method, as claimed in claim 22, wherein:

said sealing step further comprises tightening said engagement between said biasing spring and said housing.

24. A method, as claimed in claim 15, further comprising the step of:

securing a biasing spring to said housing using a first force for execution of at least said introducing step, wherein said biasing spring engages said sealing member for said sealing step, and wherein said sealing step further comprises securing said biasing spring to said housing using a second force that is greater than said first force.

25. A method, as claimed in claim 15, wherein:

said introducing step comprises moving said sealing member out of said forcible engagement with said housing by a fluid pressure of a flow of said first fluid into said enclosed space through is said first port.

26. A method, as claimed in claim 15, wherein:

said first fluid is selected from the group consisting of helium, hydrogen, argon, nitrogen, air, and any combination thereof.

27. A method, as claimed in claim 15, wherein:

said biasing step comprises using a spring that is attached to said housing.

28. A method, as claimed in claim 15, wherein:

said sealing step comprises deforming a metal disposed on at least an exterior of said sealing member into at least substantially conforming relation with an interfacing surface of said housing.

29. A method, as claimed in claim 15, wherein:

said sealing step comprises disposing said sealing member at least partially within a recess formed on an exterior surface of said housing and extending a spring over at least a portion of said recess to engage said sealing member and bias said sealing member into said forcible engagement with said housing, wherein said first port is disposed within said recess.

30. A data storage device, comprising:

a housing comprising interior and exterior surfaces and that defines an at least substantially enclosed space;

a computer-readable data storage medium disposed within said housing;

an actuator assembly disposed within said housing;

a first port that extends between said interior and exterior surfaces of said housing;

a sealing member associated with said first port; and a biasing member interconnected with said housing and engaged with said sealing member, wherein said exterior surface of said housing comprises a recess, wherein said first port is disposed within said recess, wherein said sealing member is at least partially disposed within said recess, and wherein a diameter of said sealing member is greater than a depth of said recess such that said sealing member extends beyond that portion of said exterior surface that is disposed about said recess.

31. A data storage device, comprising:

a housing comprising interior and exterior surfaces and that defines an at least substantially enclosed space;

a computer-readable data storage medium disposed within said housing;

an actuator assembly disposed within said housing;

a first port that extends between said interior and exterior surfaces of said housing;

a sealing member associated with said first port; and a biasing member interconnected with said housing and engaged with said sealing member, wherein said exterior surface of said housing comprises a recess, wherein said first port is disposed within said recess, wherein said sealing member is at least partially disposed within said recess, wherein said biasing member is attached to said housing beyond said recess and extends over said recess to engage said sealing member, and wherein a diameter of said sealing member is greater than a depth of said recess such that said sealing member extends beyond that portion of said exterior surface that is disposed about said recess.

32. A data storage device, comprising:

a housing comprising interior and exterior surfaces and that defines an at least substantially enclosed space;

a fluid within said enclosed space;

a computer-readable data storage medium disposed within said housing;

an actuator assembly disposed within said housing;

a first port that extends between said interior and exterior surfaces of said housing;

a sealing member disposed over said first port on said exterior surface of said housing; and a biasing member interconnected with said housing, disposed exteriorly of said housing, and engaged with said sealing member said biasing member including a spring which resiliently forces said sealing member into engagement with said exterior surface of said housing to block said first port, wherein blocking said first port at least substantially isolates said enclosed space from an environment that is external to said data storage device and thereby retains said fluid within said enclosed space.

33. A data storage device, as claimed in claim 32, wherein:
said sealing member comprises a metal exterior.

34. A data storage device, as claimed in claim 33, wherein:
said metal exterior is softer than a material that defines a portion of said housing engaged by said metal exterior of said sealing member.

35. A data storage device, as claimed in claim 32, wherein:
said exterior surface of said housing comprises a recess, wherein said first port is disposed within said recess, and wherein said sealing member is at least partially disposed within said recess.

36. A data storage device, as claimed in claim 35, wherein:
said biasing member is attached to said housing beyond said recess and extends over said recess to engage said sealing member.

37. A data storage device, as claimed in claim 35, wherein:
a diameter of said sealing member is greater than a depth of said recess such that said sealing member extends beyond that portion of said exterior surface that is disposed about said recess.

38. A data storage device, as claimed in claim 35, wherein:
said biasing member is attached to said housing beyond said recess and extends over said recess to engage said sealing member, and wherein a diameter of said sealing member is greater than a depth of said recess such that said sealing member extends beyond that portion of said exterior surface that is disposed about said recess.

39. A method for making a data storage device, said method comprising the steps of:
withdrawing a first fluid from an enclosed space within a housing of said data storage device, wherein said data storage device comprises a computer-readable data storage medium disposed within said enclosed space;
introducing a second fluid into said enclosed space through a first port that extends through a wall of said housing; and
sealing said first port after said introducing step, wherein said sealing step comprises biasing a sealing member into forcible engagement with said housing, wherein said withdrawing a first fluid step comprises withdrawing said first fluid from said enclosed space through said first port and past a space between said sealing member and said housing.

40. A method for making a data storage device, said method comprising the steps of:
withdrawing a first fluid from an enclosed space within a housing of said data storage device, wherein said data storage device comprises a computer-readable data storage medium disposed within said enclosed space;
introducing a second fluid into said enclosed space through a first port that extends through a wall of said housing; and
sealing said first port after said introducing step, wherein said sealing step comprises biasing a sealing member into forcible engagement with said housing, wherein said withdrawing step comprises moving said sealing member out of said forcible engagement with said housing and against a force used by said biasing step, wherein said moving step is provided by a fluid pressure of a flow of said first fluid out of said enclosed space.

41. A method for making a data storage device, said method comprising the steps of:
withdrawing a first fluid from an enclosed space within a housing of said data storage device, wherein said data storage device comprises a computer-readable data storage medium disposed within said enclosed space;
introducing a second fluid into said enclosed space through a first port that extends through a wall of said housing; and
sealing said first port after said introducing step, wherein said sealing step comprises biasing a sealing member into forcible engagement with said housing, wherein said withdrawing step is executed and completed before said introducing step.

42. A method for making a data storage device, said method comprising the steps of:
withdrawing a first fluid from an enclosed space within a housing of said data storage device, wherein said data storage device comprises a computer-readable data storage medium disposed within said enclosed space;
introducing a second fluid into said enclosed space through a first port that extends through a wall of said housing;
sealing said first port after said introducing step, wherein said sealing step comprises biasing a sealing member into forcible engagement with said housing; and
reducing a magnitude of a biasing force exerted on said sealing member for said sealing step, wherein said reducing step is executed before executing at least one of said withdrawing and introducing steps.

43. A method for making a data storage device, said method comprising the steps of:
withdrawing a first fluid from an enclosed space within a housing of said data storage device, wherein said data storage device comprises a computer-readable data storage medium disposed within said enclosed space;
introducing a second fluid into said enclosed space through a first port that extends through a wall of said housing;
sealing said first port after said introducing step, wherein said sealing step comprises biasing a sealing member into forcible engagement with said housing; and
loosening an engagement between a biasing spring and said housing for execution of at least one of said withdrawing and introducing steps, wherein said biasing spring engages said sealing member for said sealing step.

44. A method for making a data storage device, said method comprising the steps of:
withdrawing a first fluid from an enclosed space within a housing of said data storage device, wherein said data storage device comprises a computer-readable data storage medium disposed within said enclosed space;
introducing a second fluid into said enclosed space through a first port that extends through a wall of said housing;
sealing said first port after said introducing step, wherein said sealing step comprises biasing a sealing member into forcible engagement with said housing; and loosening an engagement between a biasing spring and said housing for execution of at least one of said withdrawing and introducing steps, wherein said biasing spring engages said sealing member for said sealing step, wherein said sealing step further comprises tightening said engagement between said biasing spring and said housing.

45. A method for making a data storage device, said method comprising the steps of:

withdrawing a first fluid from an enclosed space within a housing of said data storage device, wherein said data storage device comprises a computer-readable data storage medium disposed within said enclosed space;

introducing a second fluid into said enclosed space through a first port that extends through a wall of said housing;

sealing said first port after said introducing step, wherein said sealing step comprises biasing a sealing member into forcible engagement with said housing; and securing a biasing spring to said housing using a first force for execution of at least one of said withdrawing and introducing steps, wherein said biasing spring engages said sealing member for said sealing step, and wherein said sealing step further comprises securing said biasing spring to said housing using a second force that is greater than said first force.

46. A method for making a data storage device, said method comprising the steps of:

withdrawing a first fluid from an enclosed space within a housing of said data storage device, wherein said data storage device comprises a computer-readable data storage medium disposed within said enclosed space;

introducing a second fluid into said enclosed space through a first port that extends through a wall of said housing; and sealing said first port after said introducing step, wherein said sealing step comprises biasing a sealing member into forcible engagement with said housing, wherein said introducing step comprises moving said sealing member out of said forcible engagement with said housing by a fluid pressure of a flow of said second fluid into said enclosed space.

47. A method for making a data storage device, said method comprising the steps of:

withdrawing a first fluid from an enclosed space within a housing of said data storage device, wherein said data storage device comprises a computer-readable data storage medium disposed within said enclosed space;

introducing a second fluid into said enclosed space through a first port that extends through a wall of said housing; and sealing said first port after said introducing step, wherein said sealing step comprises biasing a sealing member into forcible engagement with said housing, wherein said biasing step comprises using a spring that is attached to said housing.

48. A method for making a data storage device, said method comprising the steps of:

withdrawing a first fluid from an enclosed space within a housing of said data storage device, wherein said data storage device comprises a computer-readable data storage medium disposed within said enclosed space;

introducing a second fluid into said enclosed space through a first port that extends through a wall of said housing; and sealing said first port after said introducing step, wherein said sealing step comprises biasing a sealing member into forcible engagement with said housing, wherein said sealing step comprises disposing said sealing member at least partially within a recess formed on an exterior surface of said housing and extending a spring over at least a portion of said recess to engage said sealing member and bias said sealing member into engagement with said housing, wherein said first port is disposed within said recess.

49. A method for making a data storage device, said method comprising the steps of:

introducing a first fluid into an enclosed space within a housing of said data storage device, wherein said data storage device comprises a computer-readable data storage medium disposed within said enclosed space, wherein said introducing step is executed through a first port that extends through a wall of said housing;

sealing said first port after said introducing step, wherein said sealing step comprises biasing a sealing member into forcible engagement with said housing; and loosening an engagement between a biasing spring and said housing for execution of at least said introducing step, wherein said biasing spring engages said sealing member for said sealing step.

50. A method for making a data storage device, said method comprising the steps of:

introducing a first fluid into an enclosed space within a housing of said data storage device, wherein said data storage device comprises a computer-readable data storage medium disposed within said enclosed space, wherein said introducing step is executed through a first port that extends through a wall of said housing;

loosening an engagement between a biasing spring and said housing for execution of at least said introducing step, wherein said biasing spring engages said sealing member for said sealing step; and sealing said first port after said introducing step, wherein said sealing step comprises biasing a sealing member into forcible engagement with said housing, wherein said sealing step further comprises tightening said engagement between said biasing spring and said housing.

51. A method for making a data storage device, said method comprising the steps of:

introducing a first fluid into an enclosed space within a housing of said data storage device, wherein said data storage device comprises a computer-readable data storage medium disposed within said enclosed space, wherein said introducing step is executed through a first port that extends through a wall of said housing;

sealing said first port after said introducing step, wherein said sealing step comprises biasing a sealing member into forcible engagement with said housing; and securing a biasing spring to said housing using a first force for execution of at least said introducing step, wherein said biasing spring engages said sealing member for said sealing step, and wherein said sealing step further comprises securing said biasing spring to said housing using a second force that is greater than said first force.

52. A method for making a data storage device, said method comprising the steps of:

introducing a first fluid into an enclosed space within a housing of said data storage device, wherein said data storage device comprises a computer-readable data storage medium disposed within said enclosed space, wherein said introducing step is executed through a first port that extends through a wall of said housing; and sealing said first port after said introducing step, wherein said sealing step comprises biasing a sealing member into forcible engagement with said housing, and wherein said biasing step comprises using a spring that is attached to said housing.

53. A method for making a data storage device, said method comprising the steps of:

introducing a first fluid into an enclosed space within a housing of said data storage device, wherein said data storage device comprises a computer-readable data storage medium disposed within said enclosed space, wherein said introducing step is executed through a first port that extends through a wall of said housing; and sealing said first port after said introducing step, wherein said sealing step comprises biasing a sealing member into forcible engagement with said housing, and wherein said sealing step comprises disposing said sealing member at least partially within a recess formed on an exterior surface of said housing and extending a spring over at least a portion of said recess to engage said sealing member and bias said sealing member into said forcible engagement with said housing, wherein said first port is disposed within said recess.

54. A data storage device, comprising:

a housing comprising interior and exterior surfaces and that defines an at least substantially enclosed space;

a computer-readable data storage medium disposed within said housing;

an actuator assembly disposed within said housing;

a first port that extends between said interior and exterior surfaces of said housing;

a sealing member associated with said first port; and a biasing member interconnected with said housing and engaged with said sealing member, wherein said exterior surface of said housing comprises a recess, wherein said first port is disposed within said recess, wherein said sealing member is at least partially disposed within said recess, and wherein said biasing member is attached to said housing beyond said recess and extends over said recess to engage said sealing member.

* * * * *